United States Patent
Chae et al.

(10) Patent No.: US 10,449,963 B2
(45) Date of Patent: Oct. 22, 2019

(54) FOLLOWING CRUISE CONTROL METHOD AND FOLLOWING CRUISE CONTROL DEVICE

(71) Applicant: HANWHA DEFENSE CO., LTD., Changwon-si (KR)

(72) Inventors: Hee Seo Chae, Changwon-si (KR); Tae Ryong Kim, Changwon-si (KR); Tae Hyoung Kim, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 176 days.

(21) Appl. No.: 15/696,391

(22) Filed: Sep. 6, 2017

(65) Prior Publication Data

US 2018/0154895 A1 Jun. 7, 2018

(30) Foreign Application Priority Data

Dec. 1, 2016 (KR) .......................... 10-2016-0162913

(51) Int. Cl.
*B60W 30/165* (2012.01)
*B60W 30/09* (2012.01)
(Continued)

(52) U.S. Cl.
CPC .......... *B60W 30/165* (2013.01); *B60W 10/04* (2013.01); *B60W 10/18* (2013.01);
(Continued)

(58) Field of Classification Search
CPC .... B60W 30/165; B60W 30/16; B60W 10/20; B60W 30/09; B60W 10/18; B60W 10/04;
(Continued)

(56) References Cited

U.S. PATENT DOCUMENTS 6,032,097 A * 2/2000 Iihoshi ................. G05D 1/0293
701/96
6,246,932 B1 * 6/2001 Kageyama ........... G05D 1/0297
340/992

(Continued)

FOREIGN PATENT DOCUMENTS

KR 10-0199757 B1 6/1999
KR 10-2011-0011936 A 2/2011
(Continued)

*Primary Examiner* — Muhammad Shafi
(74) *Attorney, Agent, or Firm* — Sughrue Mion, PLLC

(57) ABSTRACT

A following cruise control method is provided for controlling a control vehicle to follow a target vehicle, the following cruise control method including: determining one of a plurality of vehicles cruising in a group as the target vehicle based on preset priorities of the plurality of vehicles; receiving following-target information comprising at least one of driving information, position information, and state information from the target vehicle; controlling follow-cruising of the control vehicle to follow the target vehicle with a preset following distance from the target vehicle by generating a driving command based on the following-target information; determining whether the target vehicle is abnormal based on the following-target information; and in response to the target vehicle being determined to be abnormal, stopping the follow-cruising of the control vehicle.

20 Claims, 7 Drawing Sheets

(51) Int. Cl.
- *B60W 10/04* (2006.01)
- *B60W 10/20* (2006.01)
- *B60W 10/18* (2012.01)
- *B60W 30/16* (2012.01)
- *G08G 1/00* (2006.01)
- *B60K 31/00* (2006.01)

(52) U.S. Cl.
CPC ............ *B60W 10/20* (2013.01); *B60W 30/09* (2013.01); *B60W 30/16* (2013.01); *G08G 1/22* (2013.01); *B60K 2031/0025* (2013.01); *B60W 2420/42* (2013.01); *B60W 2420/52* (2013.01); *B60W 2550/10* (2013.01); *B60W 2550/302* (2013.01); *B60W 2550/308* (2013.01); *B60W 2550/402* (2013.01); *B60W 2550/408* (2013.01); *B60W 2750/308* (2013.01); *B60Y 2200/11* (2013.01); *B60Y 2200/24* (2013.01)

(58) Field of Classification Search
CPC ....... B60W 2420/52; B60W 2550/302; B60W 2550/402; B60W 2550/408; B60W 2550/10; B60W 2420/42; B60W 2550/308; B60W 2750/308; G08G 1/22; B60K 2031/0025; B60Y 2200/11; B60Y 2200/24

USPC .......................................................... 701/96
See application file for complete search history.

(56) References Cited

U.S. PATENT DOCUMENTS

| | | | | |
|---|---|---|---|---|
| 7,194,347 | B2* | 3/2007 | Harumoto | B60R 21/0132 340/436 |
| 8,352,112 | B2* | 1/2013 | Mudalige | G08G 1/22 340/435 |
| 8,948,995 | B2* | 2/2015 | Pandita | B60W 30/17 180/168 |
| 9,384,666 | B1* | 7/2016 | Harvey | G05D 1/0088 |
| 9,711,050 | B2* | 7/2017 | Ansari | G08G 1/167 |

FOREIGN PATENT DOCUMENTS

| | | |
|---|---|---|
| KR | 10-2015-0076757 A | 7/2015 |
| KR | 10-2016-0004115 A | 1/2016 |

* cited by examiner

FOLLOWING CRUISE CONTROL METHOD AND FOLLOWING CRUISE CONTROL DEVICE

CROSS-REFERENCE TO RELATED APPLICATION

This application claims priority from Korean Patent Application No. 10-2016-0162913, filed on Dec. 1, 2016, in the Korean Intellectual Property Office, the disclosure of which is incorporated herein by reference in its entirety.

BACKGROUND

1. Field

Exemplary embodiments relate to a following cruise control method and a following cruise control device.

2. Description of the Related Art

Along with the development of autonomous cruise technology, group cruise techniques for autonomously driving a plurality of vehicles in a group have been widely researched. In the case of group cruise, a plurality of vehicles cruise to a particular destination in a row. In the related art, when a plurality of vehicles cruise in a group, the foremost vehicle cruises along a certain route, and the other vehicles, driving behind the foremost vehicle, follow the foremost vehicle while each of the following vehicles maintains a certain distance from its preceding vehicle. That is, vehicles other than the foremost vehicle travel depending on traveling conditions of their respective preceding vehicles.

In this case, however, if one vehicle (e.g., a mal-functioning vehicle) of the plurality of vehicles stops or travels abnormally, all of the other vehicles following behind the mal-functioning vehicle may also stop or travel abnormally.

SUMMARY

Additional aspects will be set forth in part in the description which follows and, in part, will be apparent from the description, or may be learned by practice of the exemplary embodiments.

According to an aspect of an exemplary embodiment, there is provided a following cruise control method for controlling a control vehicle being an object of control to make the control vehicle follow a target vehicle, the following cruise control method including: determining one of a plurality of vehicles cruising in a group as the target vehicle based on preset priorities of the plurality of vehicles; receiving following-target information including at least one of driving information, position information, and state information about the determined target vehicle; controlling follow-cruising of the control vehicle by calculating a driving command, based on the following-target information, for the control vehicle to maintain a preset following distance; detecting whether the target vehicle is abnormal based on the following-target information; and when it is detected that the target vehicle is abnormal, stopping the follow-cruising of the control vehicle.

According to an aspect of another exemplary embodiment, there is a following cruise control device for controlling a control vehicle being an object of control to make the control vehicle follow a target vehicle, the following cruise control device including: a target vehicle determination unit configured to determine one of a plurality of vehicles cruising in a group as the target vehicle based on preset priorities of the plurality of vehicles; a communication unit configured to receive following-target information including at least one of state information, driving information, and position information from the determined target vehicle; a cruise controller configured to control follow-cruising of the control vehicle by calculating a driving command, based on the following-target information, for the control vehicle to maintain a preset following distance; and a target vehicle malfunction detector configured to detect whether the target vehicle is abnormal based on the following-target information, wherein if it is detected that the target vehicle is abnormal, the cruise controller stops the follow-cruising of the control vehicle.

According to an aspect of another exemplary embodiment, there is provided a following cruise control method for controlling a control vehicle to follow a target vehicle, the following cruise control method including: determining one of a plurality of vehicles cruising in a group as the target vehicle based on preset priorities of the plurality of vehicles; receiving following-target information comprising at least one of driving information, position information, and state information from the target vehicle; controlling follow-cruising of the control vehicle to follow the target vehicle with a preset following distance from the target vehicle by generating a driving command based on the following-target information; determining whether the target vehicle is abnormal based on the following-target information; and in response to the target vehicle being determined to be abnormal, stopping the follow-cruising of the control vehicle.

According to an aspect of another exemplary embodiment, there is provided a following cruise control device for controlling a control vehicle to follow a target vehicle, the following cruise control device being implemented by at least one hardware processor and including: a target vehicle determination unit configured to determine one of a plurality of vehicles cruising in a group as the target vehicle based on preset priorities of the plurality of vehicles; a communication unit configured to receive following-target information comprising at least one of state information, driving information, and position information from the target vehicle; a cruise controller configured to control follow-cruising of the control vehicle to follow the target vehicle with a preset following distance from the target vehicle by generating a driving command based on the following-target information; and a target vehicle malfunction detector configured to determine whether the target vehicle is abnormal based on the following-target information. In response to the target vehicle malfunction detector determining that the target vehicle to be abnormal, the cruise controller is configured to stop the follow-cruising of the control vehicle.

According to an aspect of another exemplary embodiment, there is provided a following cruise control device for controlling a second vehicle of a plurality of vehicles to follow a first vehicle of the plurality of vehicles, the following cruise control device being implemented by at least one hardware processor and including: a determination unit configured to determine one of the plurality of vehicles as the first vehicle based on preset priorities of the plurality of vehicles; a communication unit configured to receive following information comprising at least one of state information, driving information, and position information from the first vehicle about the first vehicle; a cruise controller configured to control the second vehicle to travel in a first cruise mode, the first cruise mode corresponding to controlling the second vehicle to follow the first vehicle at a preset following distance from the first vehicle by generating a command signal based on the following information; and a malfunction detector configured to determine whether the first vehicle is mal-functioning based on the following information. In response to the malfunction detector determining that the first vehicle to be mal-functioning, the cruise controller is configured to control the second vehicle to switch from the first cruise mode to a second cruise mode corresponding to an active autonomous cruise operation.

BRIEF DESCRIPTION OF THE DRAWINGS

The above and/or other aspects will become apparent and more readily appreciated from the following description of the embodiments, taken in conjunction with the accompanying drawings in which.

DETAILED DESCRIPTION

Figure 1:
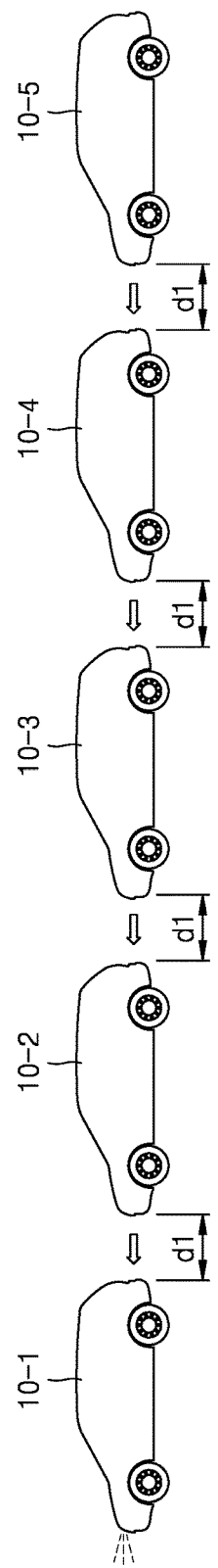
FIG. 1 is a view schematically illustrating a plurality of group-cruise vehicles including a following cruise control device according to an exemplary embodiment.

Reference will now be made in detail to exemplary embodiments, examples of which are illustrated in the accompanying drawings. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Exemplary embodiments and implementation methods thereof will be clarified through the following descriptions given with reference to the accompanying drawings. However, the exemplary embodiments may have different forms and should not be construed as being limited to the descriptions set forth herein, and it should be understood that the idea and technical scope of the exemplary embodiments cover all the modifications, equivalents, and replacements. Rather, these exemplary embodiments are provided so that this disclosure will be thorough and complete, and will fully convey the scope of the inventive concept to those skilled in the art. Moreover, detailed descriptions related to well-known functions or configurations will be ruled out in order not to unnecessarily obscure subject matters of the present disclosure.

For example, specific shapes, structures, and features described in an exemplary embodiment may be modified in another exemplary embodiment within the scope of the inventive concept. In addition, the positions or arrangement of elements described in an exemplary embodiment may be changed in another exemplary embodiment within the scope of the inventive concept. That is, the following description is prevented for illustrative purposes only and is not intended to limit the scope of the inventive concept. The scope of the inventive concept is defined by the claims and equivalents thereof. In the drawings, like reference numerals denote like elements. Details described in the present disclosure are examples. That is, such details may be changed in other exemplary embodiments within the scope of the inventive concept.

It will be understood that although the terms "first" and "second" are used herein to describe various elements, these elements should not be limited by these terms. Terms are only used to distinguish one element from other elements.

In the following description, the technical terms are used only for explaining a specific exemplary embodiment while not limiting the inventive concept. The terms of a singular form may include plural forms unless referred to the contrary. The meaning of 'include' or 'comprise' specifies a property, a fixed number, a step, a process, an element, a component, and a combination thereof but does not exclude other properties, fixed numbers, steps, processes, elements, components, and combinations thereof.

Hereinafter, the exemplary embodiments will be described in detail with reference to the accompanying drawings. In the drawings, like reference numerals denote like elements, and repeated descriptions thereof will be omitted.

Figure 2:
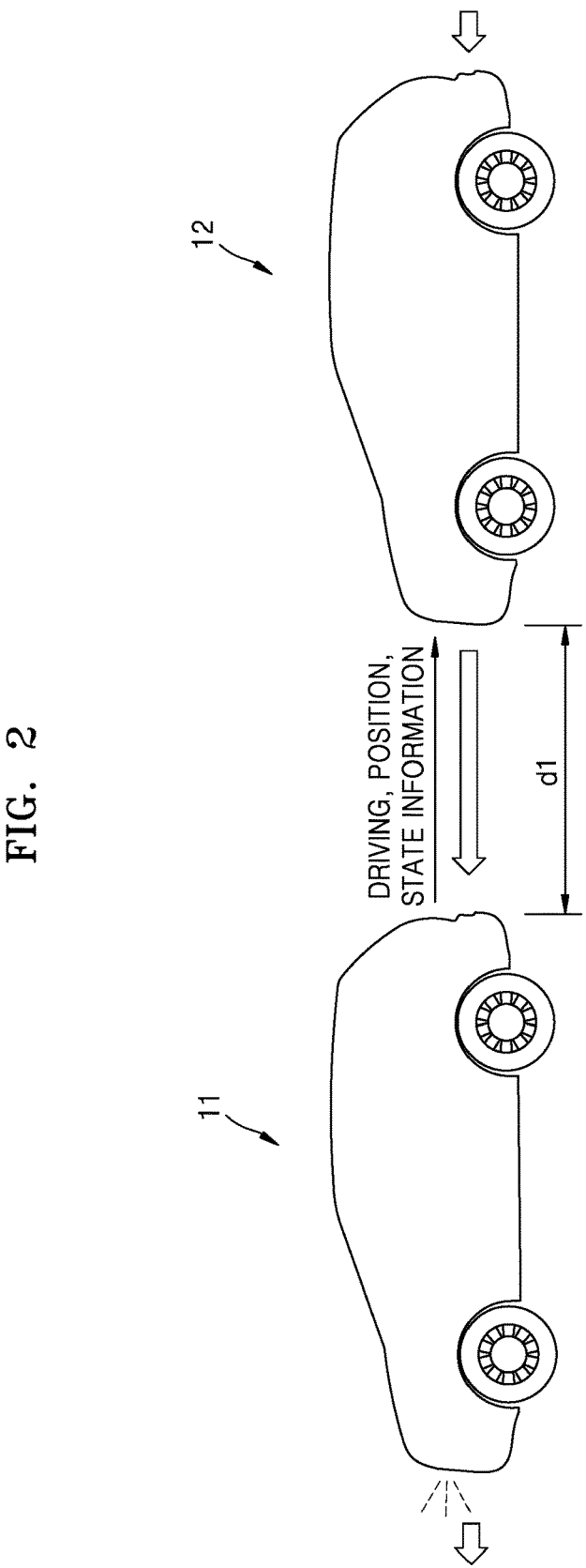
FIG. 2 is a view schematically illustrating a control vehicle including a following cruise control device and a target vehicle according to an exemplary embodiment.

FIG. 1 is a view schematically illustrating a plurality of group-cruise vehicles 10 including a following cruise control device 100 according to an exemplary embodiment, and FIG. 2 is a view schematically illustrating a control vehicle 12 including a following cruise control device 100 and a target vehicle 11 according to an exemplary embodiment.

Referring to FIG. 1, the plurality of group-cruise vehicles 10 (10-1 to 10-5) include a master vehicle 10-1, which is the foremost vehicle, and remaining vehicles 10-2 to 10-5 following the master vehicle 10-1. The plurality of group-cruise vehicles 10-1 to 10-5 may include Radio Detection And Ranging (RADAR/radar) or Light Detection and Ranging (LIDAR/lidar) to detect topographic information.

The master vehicle 10-1, which is foremost amongst the plurality of vehicles 10-1 to 10-5, travels in an active autonomous cruise mode. In the active autonomous cruise mode, the master vehicle 10-1 travels along a route previously generated based on global positioning system (GPS) information and image information obtained using the radar or lidar capable of detecting topographic information. Each of the remaining vehicles 10-2 to 10-5 following a respective preceding vehicle that travels just ahead of each of the other vehicles 10-2 to 10-5. For example, a second vehicle 10-2 follows the master vehicle 10-1, a third vehicle 10-3 follows the second vehicle 10-2, etc. In this following cruise including the plurality of group-cruise vehicles 10-1 to 10-5, a following vehicle (e.g., each of the remaining vehicles 10-2 to 10-5) travels while maintaining a preset following distance d1 from a preceding vehicle, and the preset distance d1 may be previously set by considering factors such as the purpose of group cruise or speed limit of the path the plurality of group-cruise vehicles 10-1 to 10-5 are traveling on. The remaining vehicles (or following vehicles) 10-2 to 10-5 may follow their preceding vehicles while maintaining the preset following distance d1.

The plurality of group-cruise vehicles 10-1 to 10-5 may cruise in a group in a preset order of priority. The plurality of group-cruise vehicles 10-1 to 10-5 may cruise in a group for a predetermined purpose and may have corresponding priorities according to the predetermined purpose. For example, when plurality of group-cruise vehicles 10-1 to 10-5 are transferring munitions across a possible minefield, priorities of the plurality of group-cruise vehicles 10-1 to 10-5 may be set in such a manner that certain vehicles of plurality of group-cruise vehicles 10-1 to 10-5 loaded with munitions may cruise in a rear region, and a vehicle of the plurality of group-cruise vehicles 10-1 to 10-5 capable of detecting or removing mines may cruise at the foremost position to protect the following vehicles which carry the munitions. In another example, when the plurality of group-cruise vehicles 10-1 to 10-5 cruise in an area in which the plurality of group-cruise vehicles 10-1 to 10-5 may be attacked and shot, and only some of the plurality of group-cruise vehicles 10-1 to 10-5 carry people, priorities of the vehicles may be set such that an armored unmanned vehicle may cruise at the foremost position, and certain vehicles of the plurality of group-cruise vehicles 10-1 to 10-5 carrying people may cruise in the middle position amongst the plurality of group-cruise vehicles 10-1 to 10-5.

Referring to FIG. 2, a control vehicle 12 follows a target vehicle 11 depending a predetermined cruise route and velocity of the target vehicle 11.

In the exemplary embodiment, the control vehicle 12 receives driving information from the target vehicle 11 traveling at a preceding position of the control vehicle 12. For example, the driving information may include driving commands for steering angle adjustment, acceleration control, and cruise velocity control. The control vehicle 12 also receives driving information from the target vehicle 11 which contains information about driving commands for operating brakes, depressing the gas pedal, and adjusting the angle of steering. The control vehicle 12 may receive position information from the target vehicle 11. The control vehicle 12 may estimate a distance between the control vehicle 12 and the target vehicle 11 and a traveling direction of the target vehicle 11 from the target vehicle 11 using the position information. In addition, the control vehicle 12 may receive state information (e.g., vehicle condition information) from the target vehicle 11. Here, the state information may include information about the target vehicle 11 such as damaged electric components and internal malfunctions of the target vehicle 11.

The control vehicle 12 may calculate and generate driving commands for adjusting acceleration, operating brakes, and adjusting the angle of steering based on the driving information and the position information received from the target vehicle 11. The control vehicle 12 may cruise at a following distance d1 from the target vehicle 11 by controlling a navigation device of the control vehicle 12 according to the calculated driving commands.

Figure 3:
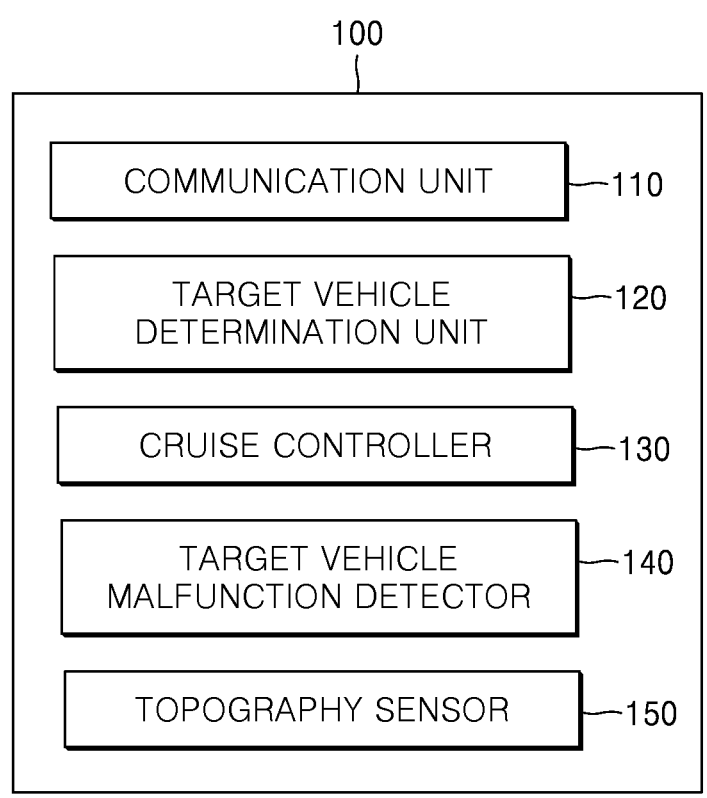
FIG. 3 is a block diagram illustrating a following cruise control device according to an exemplary embodiment.

FIG. 3 is a block diagram illustrating a following cruise control device 100 according to an exemplary embodiment.

Referring to FIG. 3, the following cruise control device 100 includes a communication unit 110, a target vehicle determination unit 120, a cruise controller 130, a target vehicle malfunction detector 140, and a topography sensor 150.

The communication unit 110 may connect the plurality of group-cruise vehicles 10-1 to 10-5 to one another that cruise in a group as illustrated in FIG. 1. For example, the communication unit 110 may receive or transmit following-target information including at least one of driving information, position information, and state information about one of the plurality of group-cruise vehicles 10-1 to 10-5. The communication unit 110 may use one or more of wireless local area network (LAN), code division multiple access (CDMA), Bluetooth, satellite communication, etc. However, the type of the communication unit 110 is not limited thereto.

The driving information may include information about, for example, an amount of adjustment of steering angle, an amount of acceleration, an amount of braking, and cruise velocity of the target vehicle 11. The position information may include, for example, GPS information about the target vehicle 11, and the state information may include information about, for example, malfunction of components (such as a battery, motors, or sensors) of the target vehicle 11.

The topography sensor 150 may include at least one of radar configured to detect obstacles located in front of the control vehicle 12 using electromagnetic waves reflected from the obstacles; lidar configured to emit laser light and receive reflected laser light to obtain images containing distance and topographic information about the surrounding area of the control vehicle 12; and a photographing device such as a camera capable of photographing the surrounding area of the control vehicle 12 in real-time. The topography sensor 150 may obtain images using the lidar and the photographing device so as to generate topographic image information about the surrounding area of a vehicle such as topographic and distance information. In addition, the topography sensor 150 may include a plurality of sensors configured to detect information necessary for controlling active autonomous cruise of a vehicle in addition to information obtained using the lidar and the camera. However, the inventive concept is not limited thereto.

The target vehicle determination unit 120 may determine a following target such as the target vehicle 11 based on priorities of vehicles as described with reference to FIG. 1. The target vehicle determination unit 120 may check the priority of the control vehicle 12 and may determine a vehicle having a priority just ahead of the priority of the control vehicle 12 as the target vehicle 11. For example, if a vehicle including the target vehicle determination unit 120 has a third priority, the target vehicle determination unit 120 may determine a vehicle having a second priority as the target vehicle 11.

According to an exemplary embodiment, if the target vehicle 11 is the master vehicle 10-1, the target vehicle determination unit 120 may re-select a master vehicle out of the remaining vehicles 10-2 to 10-5 based on state/condition of the master vehicle 10-1. The master vehicle 10-1 is foremost among the plurality of group-cruise vehicles 10 as illustrated in FIG. 1 and cruises in the active autonomous cruise mode based on surrounding information images. That is, if the target vehicle 11 is the master vehicle 10-1 having a first priority and cruising at the foremost position, and the master vehicle 10-1 is in an abnormal state such as a broken-down or malfunctioning state, the target vehicle determination unit 120 may select a new master vehicle according to preset conditions. The preset conditions will now be described.

For example, if the target vehicle determination unit 120 determines that the target vehicle 11 being in an abnormal state is the master vehicle 10-1, the target vehicle determination unit 120 may select a new master vehicle from the other vehicles cruising in the group by considering conditions of the other vehicles such as malfunction histories, load amounts, active autonomous cruise abilities, and whether the other vehicles are unmanned. The active autonomous cruise ability of a vehicle refers to whether the vehicle has devices such as lidar or cameras for active autonomous cruise and the number of times the vehicle has traveled in the active autonomous cruise mode as a master vehicle (i.e., a vehicle at the foremost position). For example, if a first vehicle has the lowest load amount among first to fifth vehicles and has active autonomous cruise ability, the target vehicle determination unit 120 may select the first vehicle as a master vehicle 10-1. However, if the first vehicle has malfunctioned many times or is an unmanned vehicle, the target vehicle determination unit 120 may select a vehicle having the second lowest load amount and active autonomous cruise ability as a master vehicle 10-1.

According to an exemplary embodiment, when the target vehicle determination unit 120 re-selects a master vehicle 10-1, the target vehicle determination unit 120 may re-determine the priorities of the remaining vehicles based on at least one of re-selection conditions. For example, if the priorities of the other vehicles are re-determined based on the load amounts and malfunction histories of the other vehicles, after the master vehicle 10-1 is selected, the other remaining vehicles may be given priorities in the order of scores calculated based on the load amounts and malfunction histories. In addition, the target vehicle determination unit 120 may transmit information about the re-selected master vehicle 10-1 to the other remaining vehicles.

In addition, the other vehicles to which priorities are re-allocated may have unique identification numbers, and the target vehicle determination unit 120 may receive and store information about the identification numbers of the other vehicles according to the priorities of the vehicles. In this case, the communication unit 110 may request a communication unit 110 of another vehicle, having the identification number of a target vehicle 11 determined by the target vehicle determination unit 120, to send following-target information and may receive the following-target information of the target vehicle 11.

The cruise controller 130 may select one of a first cruise mode for a following cruise operation and a second cruise mode for an active autonomous cruise operation. In the first cruise mode, the cruise controller 130 may receive following-target information about the target vehicle 11 and may calculate driving commands based on the following-target information so as to maintain a preset following distance d1 from the target vehicle 11. Driving information included in the following-target information is about driving commands such as the amount of adjustment of the steering angle, the acceleration, cruise velocity, and braking of the target vehicle 11.

For example, in a section from a point A to a point B, the driving information of the target vehicle 11 may include a driving command for forward cruising for 10 seconds at a speed varying from 30 km/hr to 40 km/hr and a driving command for 5-degree leftward steering for 5 seconds. In this case, when the control vehicle 12 passes the point A, the cruise controller 130 may calculate a driving command for the control vehicle 12 to cruise forward for 10 seconds at a speed varying from 30 km/hr to 40 km/hr and a driving command for the control vehicle 12 to cruise for 5 seconds at a leftward steering angle of 5 degrees. Meanwhile, although the control vehicle 12 cruises according to the calculated driving commands, the control vehicle 12 may not pass the point B but may pass a point B' adjacent to the point B. In this case, when the cruise controller 130 calculates driving commands corresponding to following-target information received at the point B, the cruise controller 130 may determine the difference between the position information about the point B and the position information about the point B'. For example, if the control vehicle 12 reaches a position deviated from a predetermined position (GPS position) at which following-target information was transmitted as described above, the cruise controller 130 may calculate driving commands for the control vehicle 12 by correcting/modifying received driving commands based on the degree of deviation.

In the second cruise mode, the cruise controller 130 may perceive the target vehicle 11 as an obstacle and may generate a path avoiding the target vehicle 11. The cruise controller 130 may generate topographic image information based on the avoidance path and images of the surrounding space and environment detected using topography sensor 150 and may perform active autonomous cruising along the avoidance path. If the control vehicle 12 is within the preset following distance d1 from a newly selected target vehicle, the cruise controller 130 may switch to the first cruise mode. In this case, the cruise controller 130 may stop cruising in the active autonomous cruise mode and may calculate driving commands depending on following-target information about the newly selected target vehicle.

The target vehicle malfunction detector 140 may detect whether the target vehicle 11 is in an abnormal state based on the driving information and position information of the target vehicle 11. The target vehicle malfunction detector 140 may estimate the position change of the target vehicle 11 (hereinafter referred to as an estimated position change) and may compare the estimated position change with the change of coordinates included in received position information (hereinafter, referred to as actual position change). If any actual position change corresponding to the estimated position change is not detected, the target vehicle malfunction detector 140 may determine that the target vehicle 11 is abnormal or mal-functioning. If the target vehicle malfunction detector 140 detects an abnormal state of the target vehicle 11, the target vehicle malfunction detector 140 may transmit information about the abnormal state of the target vehicle 11 to the cruise controller 130. In this case, the cruise controller 130 may switch from the first cruise mode to the second cruise mode.

For example, although a driving command for steering the target vehicle 11 to the left is received, if the actual position change of the target vehicle 11 detected based on the position information of the target vehicle 11 is rightward steering, the target vehicle malfunction detector 140 may determine that the target vehicle 11 is abnormal or mal-functioning. In this case, the cruise controller 130 may control the control vehicle 12 to stop cruising in the first mode and start cruising in the second cruise mode.

According to an exemplary embodiment, if the target vehicle malfunction detector 140 determines, based on the actual position change of the target vehicle 11, that the target vehicle 11 does not travel, the target vehicle malfunction detector 140 may analyze driving information of the target vehicle 11 to determine whether the target vehicle 11 is abnormal. For example, if the target vehicle malfunction detector 140 determines that the target vehicle 11 does not travel, the target vehicle malfunction detector 140 may start to analyze received driving information, and if a driving command corresponding to stop is not included in the driving information, the target vehicle malfunction detector 140 may determine that the target vehicle 11 is abnormal or mal-functioning.

According to an exemplary embodiment, in the first cruise mode, the cruise controller 130 may operate only the radar of the topography sensor 150 to detect obstacles and may not operate the lidar or the photographing device which is used to capture images based on which topographic image information is obtained. In the first cruise mode, the cruise controller 130 may calculate/generate driving commands depending on the driving information and position information of the target vehicle 11. Thus, the cruise controller 130 may perform following cruise control without using the lidar and the camera.

Unlike this, in the second cruise mode, the cruise controller 130 may generate topographic image information based on images of the surroundings obtained using the radar, lidar, and camera of the topography sensor 150. In this case, the cruise controller 130 may calculate driving commands for active autonomous cruising based on results of comparison and analysis of the topographic image information and an avoidance path.

Figure 4:
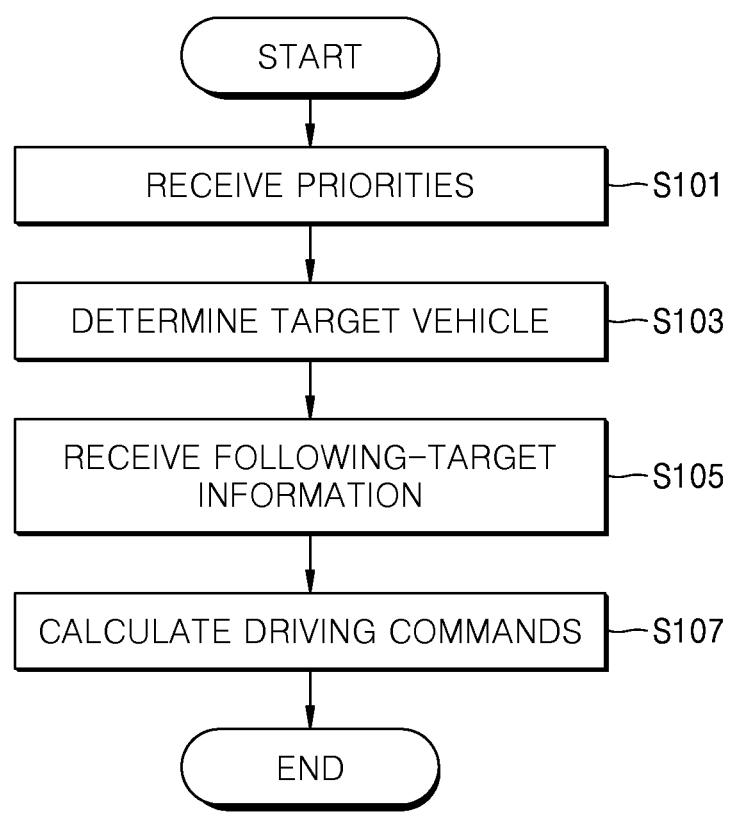
FIG. 4 is a flowchart schematic illustrating a following cruise control method according to an exemplary embodiment.

FIG. 4 is a flowchart schematic illustrating a following cruise control method according to an exemplary embodiment.

Referring to FIG. 4, the flowchart shows sequential operations performed by the following cruise control device 100 illustrated in FIG. 3. Therefore, the above descriptions of the units or devices illustrated in FIG. 3 may be applied to the method explained below with reference to the flowchart of FIG. 4 although the descriptions of the following cruise control device 100 are not repeated in the following description.

Referring to FIG. 4, the following cruise control device 100 may receive information about priorities from other vehicles cruising in a group or from an additional remote control unit (not shown) monitoring the group cruising. The following cruise control device 100 may check a priority allocated to a vehicle to be controlled, that is, a control vehicle 12 (S101).

The following cruise control device 100 may determine a vehicle having a priority higher than the priority of the control vehicle 12 as a target vehicle 11. The following cruise control device 100 may request the target vehicle 11 to send following-target information including at least one of driving information, position information, and state information. For example, if the control vehicle 12 has a third priority, the following cruise control device 100 may determine a vehicle having a second priority as the target vehicle 11 and may request the target vehicle 11 to send following-target information including at least one of driving information, position information, and state information (S103).

Next, the following cruise control device 100 may receive the following-target information from the target vehicle 11 to use the following-target information when calculating (or generating) driving commands for the control vehicle 12. The following cruise control device 100 may periodically receive the following-target information from the target vehicle 11 (S105).

The following cruise control device 100 may calculate (generate) driving commands for the control vehicle 12 based on the received following-target information so as to maintain the control vehicle 12 at a preset following distance d1 from the target vehicle 11 (S107).

For example, driving information of the target vehicle 11 for a section starting from a point A and ending at a point B may include a driving command for forward cruising for 10 seconds at a speed varying from 30 km/hr to 40 km/hr and a driving command for 5-degree leftward steering for 5 seconds. In this case, when the control vehicle 12 passes the point A, the following cruise control device 100 may calculate a driving command for forward cruising for 10 seconds at a speed varying from 30 km/hr to 40 km/hr and a driving command for 5-degree leftward steering for 5 seconds. Meanwhile, although the control vehicle 12 travels according to the calculated driving commands, the control vehicle 12 may not pass the point B but may pass a point B' adjacent to the point B. In this case, when the following cruise control device 100 calculates driving commands corresponding to following-target information received at the point B, the following cruise control device 100 may consider the difference between position information about the point B and position information about the point B'. For example, if the control vehicle 12 reaches a position deviated from a position (GPS position) at which following-target information was transmitted as described above, the following cruise control device 100 may calculate and generate driving commands for the control vehicle 12 by correcting received driving commands based on the degree of deviation.

Figure 5:
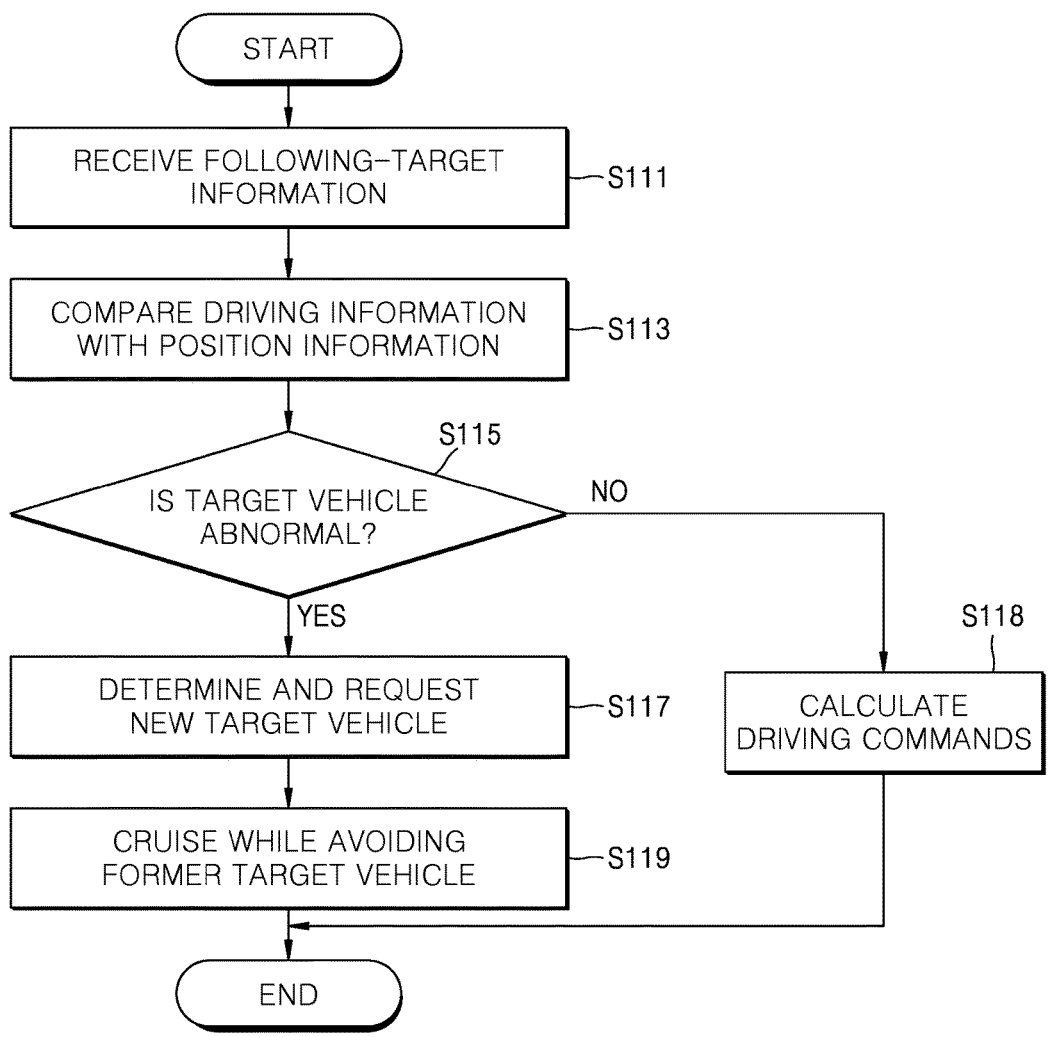
FIG. 5 is a flowchart schematically illustrating a method of detecting whether a target vehicle is abnormal according to an exemplary embodiment.

FIG. 5 is a flowchart schematically illustrating a method of detecting whether a target vehicle is abnormal according to an exemplary embodiment.

Referring to FIG. 5, the flowchart shows sequential operations performed by the following cruise control device 100 illustrated in FIG. 3. Therefore, the above descriptions of the units or devices illustrated in FIG. 3 may be applied to the method explained below with reference to the flowchart of FIG. 5 although the descriptions of the following cruise control device 100 are not repeated in the following description.

Referring to FIG. 5, the following cruise control device 100 may periodically receive following-target information including at least one of driving information, position information, and state information from the target vehicle 11 (S111).

The following cruise control device 100 may determine the actual position change of the target vehicle 11 by using the position information received from the target vehicle 11 and a position change of the target vehicle 11 estimated using the driving information received from the target vehicle 11. The following cruise control device 100 may compare the estimated position change with the actual position change to determine whether the target vehicle 11 is abnormal or malfunctioning (S113).

The following cruise control device 100 may analyze the position information of the target vehicle 11 to determine whether the position of the target vehicle 11 has changed in accordance with the estimated position change. If the estimated position change is different from the actual position change, the following cruise control device 100 may determine that the target vehicle 11 is abnormal or mal-functioning (S115).

However, the estimated position change obtained based on driving commands may be somewhat different from the actual position change because of the topography of a cruising route and position information errors, and thus if the direction and velocity of the target vehicle 11 approximately agree with estimation, it may be determined that the estimated position change and the actual position change are not different from each other (that is the target vehicle 11 is not abnormal or mal-functioning). For example, the following cruise control device 100 may estimate a position change occurring for 10 seconds in a section from a point A to a point B based on the driving information, and if it is analyzed that the actual position of the target vehicle 11 is changed for 10 seconds from the point A to a point B' which is within a preset radius from the point B, the following cruise control device 100 may determine that the target vehicle 11 is not abnormal or mal-functioning even though there is a slight difference between the estimated position and the actual position. The preset radius may be arbitrarily set. However, if the estimated position change is eastward but the actual position change occurs in a different direction such as a northward direction, the following cruise control device 100 may determine that the target vehicle 11 is abnormal or mal-functioning.

If the following cruise control device 100 detects an abnormal state of the target vehicle 11, the following cruise control device 100 may re-select a target vehicle. The following cruise control device 100 may select a preceding vehicle of the target vehicle 11 as a new target vehicle. For example, if the control vehicle 12 that is controlled by the following cruise control device 100 has a third priority and the target vehicle 11 has a second priority, the target vehicle 11 follows a vehicle having a first priority. In this case, the following cruise control device 100 may determine the vehicle having a first priority higher than the priority of the target vehicle 11 as a new target vehicle. The following cruise control device 100 may request and receive following-target information from the new target vehicle (S117).

Meanwhile, if the following cruise control device 100 detects no abnormal state of the target vehicle 11, the following cruise control device 100 may calculate driving commands for maintaining a preset following distance d1 from the target vehicle 11 based on driving information and position information received from the target vehicle 11 (S118).

If a new target vehicle is selected, the following cruise control device 100 may start an active autonomous cruise operation to avoid the former target vehicle 11. The following cruise control device 100 may perform the active autonomous cruise operation based on topographic image information and an avoidance path as described with reference to FIG. 3, so as to avoid the former target vehicle 11 and follow the new target vehicle (S119).

For example, in the first cruise mode for a following cruise operation, the following cruise control device 100 may detect front obstacles by only operating the radar of the topography sensor 150, and if an abnormal state of the target vehicle 11 is detected, the following cruise control device 100 may switch to the second cruise mode. In this case, the following cruise control device 100 may obtain images of the surrounding environment and space of the control vehicle 12 and may generate topographic image information based on the images. The following cruise control device 100 may calculate driving commands based on the topographic image information and an avoidance path for active autonomous cruising along the avoidance path.

According to an exemplary embodiment, if it is determined, based on the position information of the target vehicle 11, that the position of the target vehicle 11 is not changed, the following cruise control device 100 may analyze the driving information of the target vehicle 11 to determine whether the target vehicle 11 has stopped intentionally or due to a malfunction. For example, if the same position information is received from the target vehicle 11 for a predetermined time period or a stop command is not included in the driving information of the target vehicle 11, the following cruise control device 100 may determine that the target vehicle 11 malfunctions.

The following cruise control device 100 may transmit information about the malfunction of the target vehicle 11 to another vehicle following the control vehicle 12. After a following cruise control device 100 of the other vehicle receives the information, the following cruise control device 100 of the other vehicle may perceive the target vehicle 11 as an obstacle as the control vehicle 12 did and may avoid the target vehicle 11.

Figure 6:
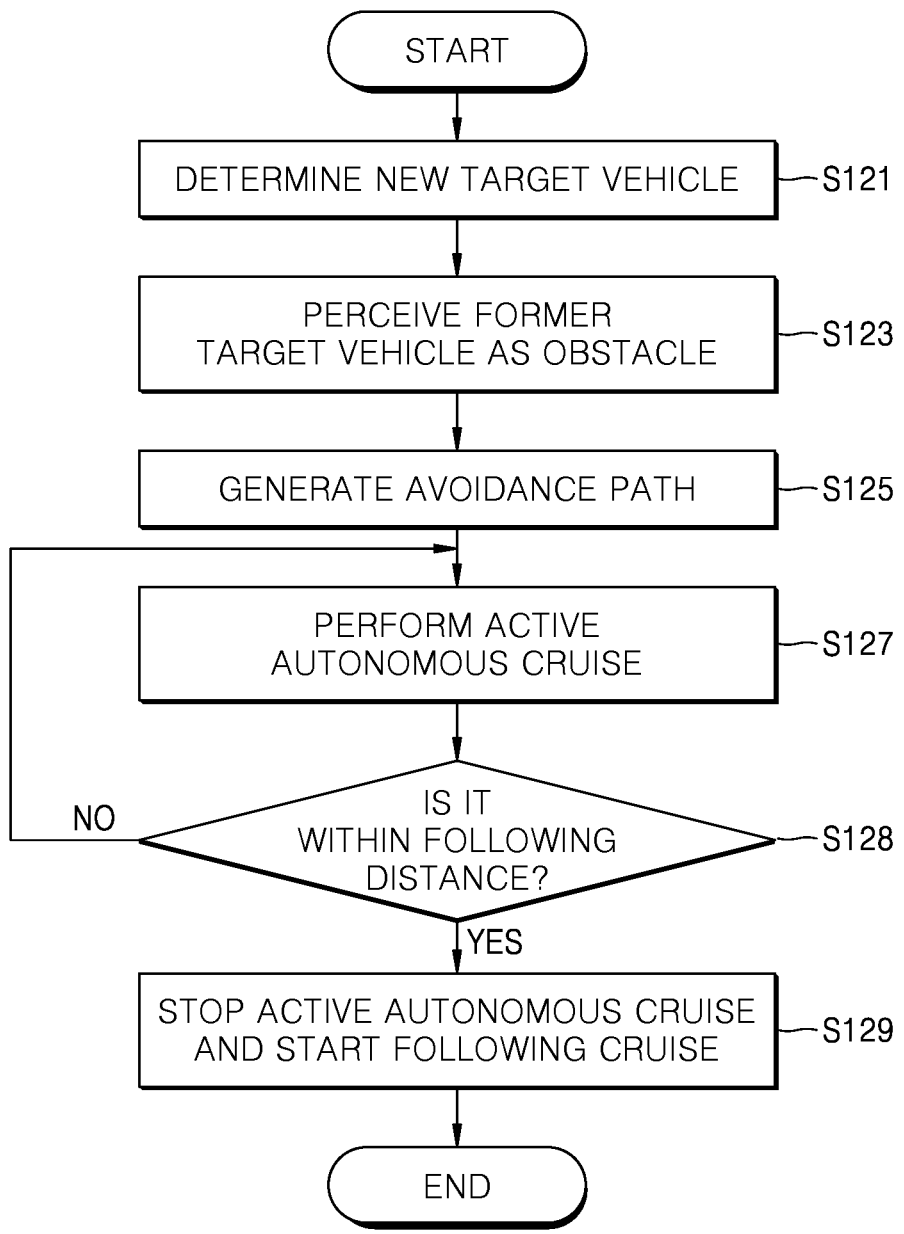
FIG. 6 is a flowchart schematically illustrating a method of following a new target vehicle according to an following cruise control method of an exemplary embodiment.

FIG. 6 is a flowchart schematically illustrating a method of following a new target vehicle according to an exemplary embodiment.

Referring to FIG. 6, the flowchart shows sequential operations performed by the following cruise control device 100 illustrated in FIG. 3. Therefore, the above descriptions of the units or devices illustrated in FIG. 3 may be applied to the method explained below with reference to the flowchart of FIG. 6 although the descriptions of the following cruise control device 100 are not repeated in the following description.

Referring to FIG. 6, the following cruise control device 100 may determine a new target vehicle according to preset priorities of vehicles as described with to FIG. 1. After the following cruise control device 100 determines the new target vehicle, the following cruise control device 100 may request the new target vehicle to send following-target information including at least one of driving information, position information, and state information (S121).

If the following cruise control device 100 detects that the target vehicle 11 is abnormal, the following cruise control device 100 may stop cruising in the first cruise mode and may perceive the target vehicle 11 as an obstacle (S123).

After the following cruise control device 100 perceives (or determines) the target vehicle 11 as an obstacle, the following cruise control device 100 may generate an avoidance path to follow the new target vehicle. The following cruise control device 100 may generate the avoidance path based on position information received from the target vehicle 11 (S125).

The following cruise control device 100 may perform an active autonomous cruise operation along the avoidance path until the following cruise control device 100 reaches a position that is located from the new target vehicle by a preset following distance d1. The following cruise control device 100 may generate topographic image information (described with reference to FIG. 3) based on image information about surroundings detected by the topography sensor 150. The following cruise control device 100 may perform the active autonomous cruise operation along the avoidance path based on the generated topographic image information (S127).

The following cruise control device 100 may determine whether the following cruise control device 100 reaches a position that is located from the new target vehicle by the preset following distance d1 or less (S128).

If the following cruise control device 100 does not reach a position distant from the new target vehicle by the preset following distance d1 or less, the following cruise control device 100 may continue the active autonomous cruise operation, and if the following cruise control device 100 reaches a position location from the new target vehicle 11 by the preset following distance d1 or less, the following cruise control device 100 may switch from the second cruise mode to the first cruise mode (S129).

Figure 7:
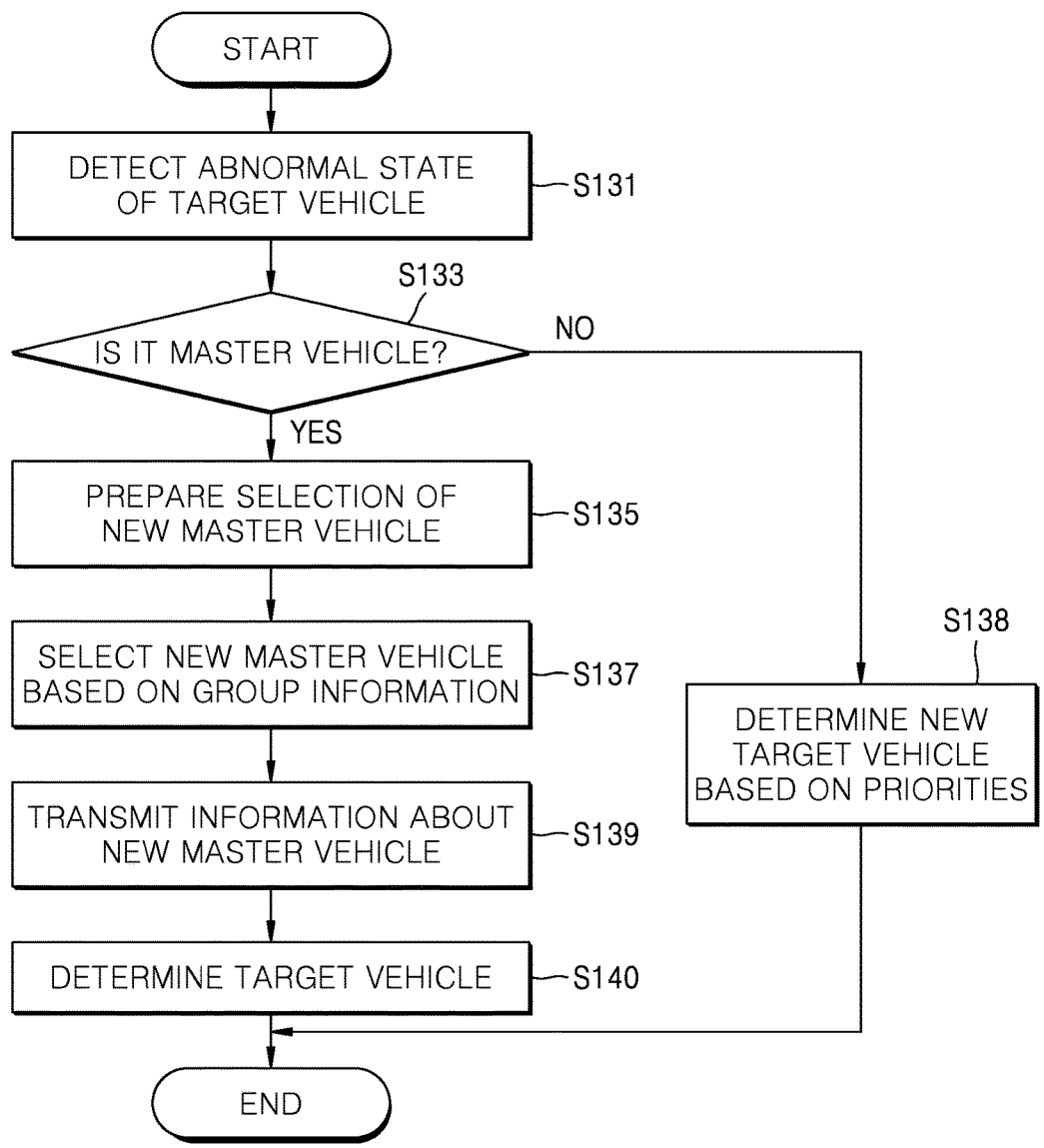
FIG. 7 is a flowchart schematically illustrating a method of reselecting a master vehicle according to a following cruise control method of an exemplary embodiment.

FIG. 7 is a flowchart schematically illustrating a method of re-selecting a master vehicle according to an exemplary embodiment.

Referring to FIG. 7, the following cruise control device 100 may detect whether a target vehicle 11 is abnormal or mal-functioning based on following-target information of the target vehicle 11. The following cruise control device 100 may estimate a position change of the target vehicle 11 based on driving information included in following-target information about the target vehicle 11. If the estimated position change is different from the actual position change of the target vehicle 11 calculated using position information received from the target vehicle 11, the following cruise control device 100 may detect that the target vehicle 11 malfunctions (in an abnormal state). If the target vehicle 11 malfunctions, the following cruise control device 100 may transmit information about the malfunction of the target vehicle 11 to other vehicles traveling in a group (S131).

The following cruise control device 100 may determine whether the malfunctioning target vehicle 11 is a master vehicle 10-1. The master vehicle 10-1 is a vehicle cruising along a preset route in an active autonomous cruise mode at the head of vehicles traveling as a group. The master vehicle 10-1 may generate topographic image information using the topography sensor 150 and may cruise in the active autonomous cruise mode based on the topographic image information and the preset route. That is, the master vehicle 10-1 does not calculate driving commands based on driving information and position information of a particular vehicle but may actively autonomously cruise while calculating driving commands based on a given route and image information detected using the topography sensor 150. For example, if the target vehicle 11 has a first priority, the following cruise control device 100 may determine that the target vehicle 11 is a master vehicle 10-1 (S133).

If the malfunctioning target vehicle 11 is the master vehicle 10-1, the following cruise control device 100 may select a new master vehicle. The following cruise control device 100 may transmit a signal to the plurality of group-cruise vehicles 10 to request preparation for a process of selecting a new master vehicle. For example, before the following cruise control device 100 selects a new master vehicle, the following cruise control device 100 may transmit a preparation signal including a control signal for stopping the other vehicles (i.e., vehicles other than the master vehicle 10-1 which is mal-functioning). Because only the master vehicle 10-1 cruises foremost along a preset route in the active autonomous cruise mode, the following cruise control device 100 may stop the remaining group-cruise vehicles until a new master vehicle is selected as a vehicle traveling foremost and leading the other group-cruise vehicles 10 (S135).

The following cruise control device 100 may select a new master vehicle by considering the malfunction histories, load amounts, and active autonomous cruise abilities of the group-cruise vehicles 10, and whether the group-cruise vehicles 10 are unmanned (i.e., based on priorities). The active autonomous cruise ability of a vehicle refers whether the vehicle has devices such lidar or cameras for active autonomous cruising and the number of times the vehicle has traveled in the active autonomous cruise mode as a master vehicle. For example, if a third vehicle has the lowest load amount among first to fifth vehicles and has active autonomous cruise ability, the following cruise control device 100 may select the third vehicle as a new master vehicle. However, if the third vehicle has malfunctioned many times or is an unmanned vehicle, the following cruise control device 100 may select a vehicle having the second lowest load amount and active autonomous cruise ability as a new master vehicle (S137).

When the master vehicle 10-1 malfunctions and thus group cruising is impossible, a control vehicle 12 following the malfunctioning master vehicle 10-1 may perform a process of re-selecting a master vehicle instead of waiting for an instruction from a remote control unit (not shown) controlling the group cruising, so as to resume the group cruising after a minimal delay.

Meanwhile, if the malfunctioning target vehicle 11 is not the master vehicle 10-1, the following cruise control device 100 may select a vehicle followed by the malfunctioning target vehicle 11, that is, a preceding vehicle having a higher priority than the malfunction target vehicle 11, as a new target vehicle and may control the control vehicle 12 to follow the new target vehicle (S138).

After selecting the new master vehicle, the following cruise control device 100 may transmit information about the new master vehicle to the other group-cruise vehicles 10. In this case, after the new master vehicle departs, the other group-cruise vehicles 10 may sequentially depart according to their priories and may thus be rearranged according to their priorities (S139).

The following cruise control device 100 may determine the new master vehicle as a new target vehicle (S140).

According to an exemplary embodiment, the following cruise control device 100 may store information about the group-cruise vehicles and the purpose of group cruising prior to the cruise. The information about the group-cruise vehicles include characteristics of the group-cruise vehicles (such as kinds of loads, armor, the degree of arming, or the kinds of detectors), tasks, reliability (malfunction histories), active autonomous cruise abilities, group cruse purposes, etc. If the malfunctioning target vehicle 11 is the master vehicle 10-1, the following cruise control device 100 may select a new master vehicle from one of the other vehicles based on at least one entry of the information about the group-cruise vehicles.

According to an exemplary embodiment, the following cruise control device 100 may select the new master vehicle by further determining the cause of malfunction of the target vehicle 11. For example, if it is analyzed, based on state information received from the target vehicle 11, that components of the master vehicle 10-1 are damaged at the same time period with the malfunctioning of the target vehicle 11, the following cruise control device 100 may determine that the master vehicle 10-1 malfunctions because of shooting from the enemies. In this case, the following cruise control device 100 may allocate a high priority to an armored vehicle capable of resisting against shooting of enemies and may select the armored vehicle as a new master vehicle.

According to an exemplary embodiment, a process of selecting a new master vehicle may be performed by a vehicle having a second priority and following the master vehicle 10-1. In this case, if the master vehicle 10-1 traveling in the active autonomous cruise mode has a malfunction, the following cruise control device 100 of a vehicle following just behind the master vehicle 10-1 may detect the malfunction of the master vehicle 10-1. Then, the following cruise control device 100 may immediately select a new master vehicle according to a process of selecting a new master vehicle.

According to an exemplary embodiment, after the following cruise control device 100 reselects a master vehicle 10-1, the following cruise control device 100 may re-determine the priorities of the other group-cruise vehicles based on conditions corresponding to conditions for reselecting the master vehicle 10-1. That is, when the following cruise control device 100 determines to re-allocate priorities, for example, a vehicle being determined to follow just behind a new master vehicle is a manned vehicle or has a history of relatively many malfunctions, the following cruise control device 100 may additionally perform a process of re-determining priorities. In this case, information about re-determined priorities may be transmitted to the other vehicles. The following cruise control device 100 may determine a new target vehicle 11 based on a received new priority and may control the control vehicle 12 to follow the new target vehicle 11.

In this manner, the following cruise control device 100 may directly detect a malfunction of the target vehicle 11 based on following-target information about the target vehicle 11 so as to address abnormal group cruising when the malfunctioning target vehicle 11 stops or leaves from the group of vehicles. For example, if malfunction of the target vehicle 11 is detected, the following cruise control device 100 immediately determines a new target vehicle 11 and avoids the malfunctioning target vehicle 11 by considering the malfunctioning target vehicle 11 as an obstacle. Because the following cruise control device 100 directly analyzes the state of the target vehicle 11, the following cruise control device 100 may reduce errors in group cruising caused by a breakdown or malfunction of the target vehicle 11.

In addition, if a target vehicle being a master vehicle traveling foremost is abnormal or mal-functioning, the following cruise control device 100 may re-select a master vehicle by considering factors such as the purpose of group cruising and characteristics of group-cruise vehicles and may resume the group cruising, thereby improving reliability in group cruising.

The above-described exemplary embodiments may be implemented in the form of computer programs executable on a computer using various components, and such computer programs may be stored in computer readable media. Examples of the computer readable media may include: magnetic media such as hard disks, floppy disks, and magnetic tapes; optical recording media such as CD-ROMs and DVDs; magneto-optical media such as floptical disks; and hardware such as ROMs, RAMs, and flash memories specifically configured to store program instructions and execute the program instructions. Examples of the computer readable media may include intangible media that may be transferred over network. For example, the computer readable media may be implemented in the form of software or applications that may also be transferred and distributed over network.

In addition, the computer programs may be those designed and configured according to the exemplary embodiments or well known in the computer software industry. Examples of the computer programs may include machine codes made by compilers and high-level language codes executable on computers using interpreters.

At least one of the components, elements, modules or units represented by a block as illustrated in FIG. 3 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

In addition, the above-described operations or exemplary embodiments are examples which are not intended to limit the scope and spirit of the inventive concept. In the present disclosure, descriptions of known electric components, control systems, software, and other functional aspects thereof may not be given for conciseness. Furthermore, in the drawings, connection lines or members between elements are functional, physical, and/or electric connections that may be replaced with or used together with other functional, physical, and/or electrical connections. Elements described without using terms such as "essential" and "important" may not be necessary for constituting the inventive concept.

That is, the scope of the inventive concept is not limited to the exemplary embodiments but should be defined by the appended claims and equivalents thereof.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While exemplary embodiments have been described with reference to the figures, it will be understood by those of ordinary skill in the art that various changes in form and details may be made therein without departing from the spirit and scope of the disclosure as defined by the following claims.

What is claimed is:

1. A following cruise control method for controlling a control vehicle to follow a target vehicle, the following cruise control method comprising:
   determining one of a plurality of vehicles cruising in a group as the target vehicle based on preset priorities of the plurality of vehicles;
   receiving following-target information comprising at least one of driving information, position information, and state information from the target vehicle;
   controlling follow-cruising of the control vehicle to follow the target vehicle with a preset following distance from the target vehicle by generating a driving command based on the following-target information;
   determining whether the target vehicle is abnormal based on the following-target information; and
   in response to the target vehicle being determined to be abnormal, stopping the follow-cruising of the control vehicle.

2. The following cruise control method of claim 1, wherein the stopping the follow-cruising of the control vehicle comprises:
while stopping the follow-cruising of the control vehicle, determining a new target vehicle different from the target vehicle based on the priorities of the plurality of vehicles; and
requesting following-target information from the new target vehicle.

3. The following cruise control method of claim 1, wherein the determining whether the target vehicle is abnormal comprises:
estimating a position change of the target vehicle based on the driving information; and
comparing the estimated position change with an actual position change of the target vehicle based on the position information,
wherein in response to the estimated position change being different from the actual position change of the target vehicle, determining that the target vehicle is abnormal.

4. The following cruise control method of claim 1, wherein the determining whether the target vehicle is abnormal comprises:
detecting, based on the position information, whether the target vehicle stops; and
analyzing whether a position change of the target vehicle is based on the driving information,
wherein in response to the stopping of the target vehicle being detected based on the position information and a stopping driving command to stop the target vehicle not being included in the driving information, determining that the target vehicle is abnormal.

5. The following cruise control method of claim 2, wherein the controlling the follow-cruising of the control vehicle comprises:
determining the target vehicle as an obstacle in response to the follow-cruising stopping; and
generating an avoidance path to avoid the target vehicle.

6. The following cruise control method of claim 5, wherein the controlling the follow-cruising of the control vehicle comprises, after the avoidance path is generated, performing an active autonomous cruise operation to avoid the target vehicle based on the avoidance path.

7. The following cruise control method of claim 6, wherein the performing the active autonomous cruise operation comprises:
in response to a distance between the control vehicle and the new target vehicle being reduced to be less than or equal to the preset following distance, stopping the active autonomous cruise operation; and
generating the driving command for the control vehicle based on the following-target information from the new target vehicle.

8. The following cruise control method of claim 2, wherein in response to the target vehicle being a master vehicle traveling at a foremost position of the plurality of vehicles cruising in the group, the stopping the follow-cruising of the control vehicle further comprises selecting a new master vehicle different from the master vehicle.

9. The following cruise control method of claim 8, wherein in the selecting the new master vehicle, the new master vehicle is selected based on at least one of tasks, malfunction histories, freight, and active autonomous cruise abilities of remaining vehicles, and whether the remaining vehicles being manned.

10. The following cruise control method of claim 9, wherein the selecting the new master vehicle comprises transmitting information from the new master vehicle to the remaining vehicles.

11. A following cruise control device for controlling a control vehicle to follow a target vehicle, the following cruise control device being implemented by at least one hardware processor and comprising:
a target vehicle determination unit configured to determine one of a plurality of vehicles cruising in a group as the target vehicle based on preset priorities of the plurality of vehicles;
a communication unit configured to receive following-target information comprising at least one of state information, driving information, and position information from the target vehicle;
a cruise controller configured to control follow-cruising of the control vehicle to follow the target vehicle with a preset following distance from the target vehicle by generating a driving command based on the following-target information; and
a target vehicle malfunction detector configured to determine whether the target vehicle is abnormal based on the following-target information,
wherein in response to the target vehicle malfunction detector determining that the target vehicle to be abnormal, the cruise controller is configured to stop the follow-cruising of the control vehicle.

12. The following cruise control device of claim 11, wherein the target vehicle determination unit is configured to determine a vehicle followed by the target vehicle as a new target vehicle in response to the follow-cruising of the control vehicle being stopped, and
wherein the communication unit is configured to request and receive following-target information from the new target vehicle.

13. The following cruise control device of claim 11, wherein the target vehicle malfunction detector is configured to estimate a position change based on the driving information and configured to compare the estimated position change with an actual position change of the target vehicle based on the received position information so as to determine whether the target vehicle is abnormal.

14. The following cruise control device of claim 11, wherein the target vehicle malfunction detector is configured to detect, based on the position information, whether the target vehicle stops, and
in response to the target vehicle stopping being detected based on the position information and a stopping driving command to stop the target vehicle not being included in the driving information, the target vehicle malfunction detector is configured to determine that the target vehicle is abnormal.

15. The following cruise control device of claim 12, wherein in response to the target vehicle malfunction detector detecting that the target vehicle is abnormal, the cruise controller is configured to determine the target vehicle as an obstacle, to generate an avoidance path avoiding the target vehicle and to head toward the new target vehicle, and
the cruise controller is configured to calculate an autonomous driving command for active autonomous cruising along the avoidance path.

16. The following cruise control device of claim 15, wherein in response to a distance between the control vehicle and the new target vehicle being reduced to be less than or equal to the preset following distance, the cruise controller is configured to stop the active autonomous cruising and is configured to start the follow-cruising to follow the new target vehicle.

17. The following cruise control device of claim 11, wherein in response to the target vehicle determined as being abnormal being a master vehicle, the target vehicle determination unit is configured to select a new master vehicle from remaining vehicles of the plurality of vehicles cruising in the group based on at least one of tasks, malfunction histories, freight, and active autonomous cruise abilities of the remaining vehicles, and whether the remaining vehicles being manned.

18. The following cruise control device of claim 17, wherein before selecting the new master vehicle, the target vehicle determination unit is configure to transmit a control signal to the remaining vehicles to stop the remaining vehicles.

19. A following cruise control device for controlling a second vehicle of a plurality of vehicles to follow a first vehicle of the plurality of vehicles, the following cruise control device being implemented by at least one hardware processor and comprising:
- a determination unit configured to determine one of the plurality of vehicles as the first vehicle based on preset priorities of the plurality of vehicles;
- a communication unit configured to receive following information comprising at least one of state information, driving information, and position information from the first vehicle about the first vehicle;
- a cruise controller configured to control the second vehicle to travel in a first cruise mode, the first cruise mode corresponding to controlling the second vehicle to follow the first vehicle at a preset following distance from the first vehicle by generating a command signal based on the following information; and
- a malfunction detector configured to determine whether the first vehicle is mal-functioning based on the following information,
- wherein in response to the malfunction detector determining that the first vehicle is mal-functioning, the cruise controller is configured to control the second vehicle to switch from the first cruise mode to a second cruise mode corresponding to an active autonomous cruise operation.

20. The following cruise control device of claim 19, wherein in the second cruise mode, the cruise controller is configured to determine the first vehicle as an obstacle, to generate an avoidance path avoiding the first vehicle and to head toward a third vehicle of the plurality of vehicles, and
wherein the cruise controller is configured to calculate an autonomous driving command for the active autonomous cruise operation along the avoidance path.

* * * * *